United States Patent
Li

(10) Patent No.: US 7,830,864 B2
(45) Date of Patent: Nov. 9, 2010

(54) APPARATUS AND METHODS FOR PER-SESSION SWITCHING FOR MULTIPLE WIRELINE AND WIRELESS DATA TYPES

(75) Inventor: San-qi Li, Plano, TX (US)

(73) Assignee: Genband US LLC, Plano, TX (US)

( * ) Notice: Subject to any disclaimer, the term of this patent is extended or adjusted under 35 U.S.C. 154(b) by 672 days.

(21) Appl. No.: 11/121,626

(22) Filed: May 4, 2005

(65) Prior Publication Data

US 2006/0062225 A1  Mar. 23, 2006

Related U.S. Application Data

(60) Provisional application No. 60/611,221, filed on Sep. 18, 2004.

(51) Int. Cl.
*H04L 12/66* (2006.01)
*H04L 12/28* (2006.01)
*H04J 3/16* (2006.01)

(52) U.S. Cl. .................. 370/352; 370/389; 370/392; 370/396; 370/466

(58) Field of Classification Search ............ None
See application file for complete search history.

(56) References Cited

U.S. PATENT DOCUMENTS

| | | | |
|---|---|---|---|
| 5,375,121 A | 12/1994 | Nishino et al. | |
| 5,513,185 A | 4/1996 | Schmidt | |
| 5,570,346 A | 10/1996 | Shur | |
| 5,710,976 A | 1/1998 | Hill et al. | |
| 5,905,873 A | 5/1999 | Hartmann et al. | |
| 5,999,529 A | 12/1999 | Bernstein et al. | |
| 6,026,086 A | 2/2000 | Lancelot et al. | |
| 6,046,999 A | 4/2000 | Miki et al. | |
| 6,147,988 A | 11/2000 | Bartholomew et al. | |
| 6,167,129 A | 12/2000 | Fikis et al. | |

(Continued)

FOREIGN PATENT DOCUMENTS

CN   1276950 A   12/2000

(Continued)

OTHER PUBLICATIONS

Laurence et al., "Voice Over ATM: A Hybrid TDM/ATM Design Approach," Electronic Engineering, Morgan-Grampian Ltd., vol. 71, No. 869, Jun. 1999, pp. 81-82, 84, 86.

(Continued)

*Primary Examiner*—Huy D Vu
*Assistant Examiner*—Brandon Renner
(74) *Attorney, Agent, or Firm*—Jenkins, Wilson, Taylor & Hunt, P.A.

(57) ABSTRACT

An apparatus including a sub-element processing (SEP) module configured to perform sub-element and/or per-session processing for each of a plurality of data elements included in data being switched between ones of a plurality of transmission links. The data can include wireless packet data, wireless non-packet data, wireline packet data, wireline non-packet data, and combinations thereof. The sub-element and/or per-session processing includes at least one of extracting and bundling at least one of voice data, encoding data and signaling data corresponding to one of a plurality of channels or sessions bundled within individual ones of the plurality of data elements.

27 Claims, 3 Drawing Sheets

U.S. PATENT DOCUMENTS

| | | |
|---|---|---|
| 6,339,594 B1 | 1/2002 | Civanlar et al. |
| 6,389,016 B1 | 5/2002 | Sabaa et al. |
| 6,392,993 B1 | 5/2002 | Hamilton et al. |
| 6,424,637 B1 | 7/2002 | Pecen et al. |
| 6,549,945 B1 | 4/2003 | Sinibaldi et al. |
| 6,614,781 B1 | 9/2003 | Elliott et al. |
| 6,625,169 B1* | 9/2003 | Tofano ................. 370/466 |
| 6,647,428 B1 | 11/2003 | Bannai et al. |
| 6,671,367 B1 | 12/2003 | Graf et al. |
| 6,693,996 B2 | 2/2004 | Mansfield |
| 6,731,627 B1 | 5/2004 | Gupta et al. |
| 6,765,931 B1 | 7/2004 | Rabenko et al. |
| 6,781,996 B1 | 8/2004 | Hemmady |
| 6,791,959 B1 | 9/2004 | Palmer et al. |
| 6,795,437 B1 | 9/2004 | Räsänen et al. |
| 6,845,089 B1 | 1/2005 | Gu et al. |
| 6,850,778 B1 | 2/2005 | Honkala et al. |
| 6,850,883 B1 | 2/2005 | Kapanen et al. |
| 6,865,220 B2 | 3/2005 | Abrishami |
| 6,898,208 B1 | 5/2005 | Sligo et al. |
| 6,967,972 B1 | 11/2005 | Volftsun et al. |
| 6,973,024 B1 | 12/2005 | Joseph et al. |
| 7,006,489 B2 | 2/2006 | Li et al. |
| 7,054,318 B2* | 5/2006 | Eneroth et al. ........... 370/395.1 |
| 7,054,320 B1* | 5/2006 | Lee et al. ................. 370/395.6 |
| 7,058,085 B2 | 6/2006 | Earnshaw et al. |
| 7,068,623 B1* | 6/2006 | Barany et al. ............. 370/329 |
| 7,072,358 B2 | 7/2006 | Suvanen |
| 7,072,961 B1 | 7/2006 | Maclean et al. |
| 7,082,143 B1* | 7/2006 | LeBlanc et al. ............ 370/526 |
| 7,103,021 B2 | 9/2006 | Jou |
| 7,162,024 B2 | 1/2007 | Wah et al. |
| 7,180,892 B1* | 2/2007 | Tackin ...................... 370/389 |
| 7,181,209 B2 | 2/2007 | Tamura |
| 7,203,226 B1 | 4/2007 | Rabipour et al. |
| 7,221,660 B1 | 5/2007 | Simonson et al. |
| 7,245,589 B2 | 7/2007 | Neulist et al. |
| 7,245,931 B2 | 7/2007 | Wang et al. |
| 7,304,984 B2 | 12/2007 | Butler et al. |
| 7,305,229 B2* | 12/2007 | Fox et al. ................... 455/406 |
| 7,349,698 B2 | 3/2008 | Gallagher et al. |
| 7,369,859 B2 | 5/2008 | Gallagher |
| 7,398,088 B2 | 7/2008 | Belkin et al. |
| 7,471,655 B2 | 12/2008 | Gallagher et al. |
| 7,593,415 B2 | 9/2009 | Li et al. |
| 7,729,346 B2 | 6/2010 | Lee et al. |
| 2001/0036158 A1 | 11/2001 | Hallenstal et al. |
| 2002/0001302 A1 | 1/2002 | Pickett |
| 2002/0013147 A1 | 1/2002 | Fauconnier et al. |
| 2002/0085516 A1 | 7/2002 | Bridgelall |
| 2002/0106029 A1 | 8/2002 | Bunn et al. |
| 2002/0126674 A1 | 9/2002 | Hemmady |
| 2003/0032440 A1 | 2/2003 | Sato et al. |
| 2003/0058822 A1 | 3/2003 | Jou |
| 2003/0112796 A1* | 6/2003 | Kwan ........................ 370/352 |
| 2003/0123485 A1 | 7/2003 | Yi et al. |
| 2003/0134653 A1 | 7/2003 | Sarkkinen et al. |
| 2003/0135784 A1 | 7/2003 | Yamaguchi et al. |
| 2003/0179705 A1 | 9/2003 | Kojima |
| 2003/0210659 A1 | 11/2003 | Chu et al. |
| 2003/0212809 A1 | 11/2003 | Wu et al. |
| 2004/0008652 A1* | 1/2004 | Tanzella et al. ............. 370/338 |
| 2004/0037224 A1 | 2/2004 | Choi et al. |
| 2004/0047290 A1 | 3/2004 | Komandur et al. |
| 2004/0047364 A1* | 3/2004 | Briggs et al. ............... 370/463 |
| 2004/0090989 A1* | 5/2004 | Kobayashi .................. 370/469 |
| 2004/0100914 A1 | 5/2004 | Hellwig et al. |
| 2004/0114588 A1 | 6/2004 | Bhaskaran |
| 2004/0114922 A1 | 6/2004 | Hardee |
| 2004/0131051 A1 | 7/2004 | Rabipour et al. |
| 2004/0192295 A1 | 9/2004 | Tsao et al. |
| 2004/0196867 A1 | 10/2004 | Ejzak et al. |
| 2004/0203791 A1 | 10/2004 | Pan et al. |
| 2004/0208132 A1 | 10/2004 | Neulist et al. |
| 2004/0252681 A1 | 12/2004 | Rabipour et al. |
| 2004/0254786 A1 | 12/2004 | Kirla et al. |
| 2004/0266426 A1 | 12/2004 | Marsh et al. |
| 2005/0007973 A1 | 1/2005 | Jang et al. |
| 2005/0013281 A1 | 1/2005 | Milton et al. |
| 2005/0027948 A1 | 2/2005 | Marlan et al. |
| 2005/0073977 A1 | 4/2005 | Vanghi et al. |
| 2005/0074017 A1 | 4/2005 | Qian et al. |
| 2005/0099940 A1 | 5/2005 | Ohenoja et al. |
| 2005/0105512 A1 | 5/2005 | Myhre et al. |
| 2005/0157823 A1 | 7/2005 | Sudhakar |
| 2005/0185604 A1 | 8/2005 | Agarwal |
| 2005/0195829 A1* | 9/2005 | Ward ........................ 370/395.6 |
| 2005/0232232 A1 | 10/2005 | Farber et al. |
| 2005/0267746 A1 | 12/2005 | Jelinek et al. |
| 2006/0050664 A1* | 3/2006 | Guey ......................... 370/329 |
| 2006/0067221 A1 | 3/2006 | Lee et al. |
| 2006/0092927 A1 | 5/2006 | Li et al. |
| 2006/0111112 A1 | 5/2006 | Maveddat |
| 2006/0154686 A1 | 7/2006 | Sarkkinen et al. |
| 2006/0193289 A1 | 8/2006 | Ronneke et al. |
| 2006/0233102 A1 | 10/2006 | Kusumoto |
| 2007/0041320 A1 | 2/2007 | Chen et al. |
| 2007/0041360 A1 | 2/2007 | Gallagher et al. |
| 2007/0043558 A1 | 2/2007 | Schwarz et al. |
| 2007/0127357 A1 | 6/2007 | Tamura |
| 2007/0127436 A1 | 6/2007 | Karimi-Cherkandi et al. |
| 2007/0135165 A1 | 6/2007 | Junghanns et al. |
| 2007/0140214 A1* | 6/2007 | Zoltan ........................ 370/352 |
| 2007/0140293 A1 | 6/2007 | Agarwal et al. |
| 2007/0165636 A1 | 7/2007 | He et al. |
| 2007/0186002 A1 | 8/2007 | Campbell et al. |
| 2008/0225765 A1 | 9/2008 | Marinier et al. |
| 2008/0293416 A1 | 11/2008 | Yi et al. |
| 2008/0316980 A1 | 12/2008 | Ahlen et al. |

FOREIGN PATENT DOCUMENTS

| | | |
|---|---|---|
| CN | 1504039 A | 6/2004 |
| CN | 101341730 A | 1/2009 |
| CN | ZL 02808634.1 | 4/2009 |
| DE | 198 29 822 A1 | 1/2000 |
| EP | 1 017 217 A2 | 7/2000 |
| EP | 1 364 499 B1 | 7/2009 |
| GB | 2363295 | 12/2001 |
| WO | WO 99/29136 | 6/1999 |
| WO | WO 99/40569 | 8/1999 |
| WO | WO 02/069588 A2 | 9/2002 |
| WO | WO 02/069588 A3 | 9/2002 |
| WO | WO 03/043299 A1 | 5/2003 |
| WO | WO 2005/050960 A1 | 6/2005 |
| WO | WO 2007/022461 A2 | 2/2007 |
| WO | WO 2007/084417 A2 | 7/2007 |

OTHER PUBLICATIONS

Singer et al., "Narrowband Services Over ATM Networks: Evaluation of Trunking Methods," World Telecommunication Congress, vol. 2, Sep. 21, 1997, pp. 17-25.

EP Office Action 02709657.7, Dated Jan. 23, 2006.

International Search Report, PCT/US02/05410, dated Dec. 27, 2002.

Written Opinion, PCT/US02/05410, dated Jun. 13, 2003.

International Preliminary Examination Report, PCT/US02/05410, dated Dec. 5, 2003.

International Search Report PCT/US2006/028549 dated Dec. 11, 2006.

Non-Final Office Action for U.S. Appl. No. 11/081,998 (Aug. 6, 2008).

Notice of Allowance and Fee(s) Due for U.S. Appl. No. 11/109,337 (Jul. 15, 2008).

Non-Final Office Action for U.S. Appl. No. 11/109,337 (Mar. 5, 2008).
Non-Final Office Action for U.S. Appl. No. 11/081,998 (Oct. 26, 2007).
Notice of Allowance and Fee(s) Due for U.S. Appl. No. 11/297,941 (May 15, 2009).
Final Official Action for U.S. Appl. No. 11/230,029 (May 14, 2009).
Final Official Action for U.S. Appl. No. 11/297,941 (Jan. 22, 2009).
Communication under Rule 71(3) EPC for European Patent Application No. 02 709 657.7 (Jan. 9, 2009).
Notice of Grant of Patent Right for Invention for Chinese Patent Application No. 02808634.1 (Dec. 26, 2008).
Non-Final Official Action for U.S. Appl. No. 11/230,029 (Oct. 29, 2008).
Official Action for Chinese Patent Application No. 02808634.1 (Jun. 20, 2008).
Non-Final Official Action for U.S. Appl. No. 11/297,941 (May 1, 2008).
Notice of Allowance and Fee(s) Due for U.S. Appl. No. 09/792,265 (Sep. 16, 2005).
Final Official Action for U.S. Appl. No. 09/792,265 (Jun. 15, 2005).
Non-Final Official Action for U.S. Appl. No. 09/792,265 (Oct. 4, 2004).
Interview Summary for U.S. Appl. No. 11/207,572 (Oct. 16, 2009).
Commonly-assigned, co-pending U.S. Appl. No. 12/535,655 for "Methods, Systems, and Computer Readable Media for Intelligent Optimization of Digital Signal Processor (DSP) Resource Utilization in a Media Gateway", (Unpublished, filed Aug. 4, 2009).
Final Official Action for U.S. Appl. No. 11/207,572 (May 28, 2009).
Official Action for U.S. Appl. No. 11/207,572 (Oct. 6, 2008).
Communication pursuant to Rules 161 and 162 EPC for European application No. 06813571.4 (Mar. 28, 2008).
Notification of Transmittal of the International Search Report and the Written Opinion of the International Searching Authority, or the Declaration for International Application No. PCT/US07/00942 (Oct. 12, 2007).
Notification of Transmittal of the International Search Report and the Written Opinion of the International Searching Authority, or the Declaration for International Application No. PCT/US06/32484 (May 7, 2007).
"Third Generation Partnership Project: Technical Specification Group Core Network and Terminals; Interworking Between the IP Multimedia (IM) Core Network (CN) Subsystem and Cirecuit Switched (CS) Networks (Release 6)" 3GPP TS 29.163, pp. 1-128 (Jun. 2005).

Agilent Technologies, "UMTS Network and Service Assurance," International Engineering Consortium, http://www.iec.org/online/tutorials/agilent_umts_network/topic03.html, pp. 1-4 (Copyright 2005).
"Digital Cellular Telecommunications System Phase (2+); Universal Mobile Telecommunications System (UMTS): AMR Speech Codec, Wideband; Interface to Iu and Uu (3GPP TS 26.202 version 6.0.0 Release 6)," Global System for Mobile Communications ETSI TS 126 202, pp. 1-14 (Dec. 2004).
Notification of Transmittal of International Preliminary Examination Report for International Application No. PCT/US02/05410 (Dec. 5, 2003).
Sjoberg et al., "Real-Time Transport Protcol (RTP) Payload Format and File Storage Format for the adaptive Multi-Rate (AMR) and Adaptive Multi-Rate Wideband (AMR-WB) Audio Codecs," Network Working Group, http://www.apps.ietf.org/rfc/rfc3267html, pp. 1-48 (Jun. 2002).
"Third Generation Partnership Project," Meeting Report v3.0.0, 3GPP TSG-TrFO Workshop#04, pp. 1-18 (Oct. 17-19, 2000).
Official Action for U.S. Appl. No. 11/255,467 (May 12, 2010).
Notice of Allowance and Fee(s) Due for U.S. Appl. 11/207,572 (May 3, 2010).
Chinese Official Action for Chinese Patent Application No. 200580043559.1 (Mar. 9, 2010).
Final Official Action for U.S. Appl. No. 11/351,339 (Mar. 1, 2010).
Notice of Allowance and Fee(s) Due for U.S. Appl. No. 11/207,572 (Jan. 26, 2010).
Notice of Allowance and Fee(s) Due for U.S. Appl. No. 11/230,029 (Jan. 12, 2010).
Final Official Action for U.S. Appl. No. 11/255,467 (Sep. 9, 2009).
Official Action for U.S. Appl. No. 11/351,339 (Apr. 1, 2009).
Official Action for U.S. Appl. No. 11/255,467 (Mar. 6, 2009).
Notice of Allowance and Fee(s) Due for U.S. Appl. No. 11/351,339 (Sep. 26, 2008).
Final Official Action for U.S. Appl. No. 11/255,467 (Sep. 9, 2008).
Official Action for U.S. Appl. No. 11/255,467 (Dec. 12, 2007).
Eklund et al., "IEEE Standard 802.16: A Technical Overview of the WirelessMAN™ Air Interface for Broadband Wireless Access," IEEE Communications Magazine, pp. 98-107 (Jun. 2002).
R.L. Bunting (Editor), "Transcoder Free Operation," $3^{rd}$ Generation Partnership, Version 1.0, Project 2 (Mar. 18, 2004).
"$3^{rd}$ Generation Partnership Project; Technical Specification Group Services and Systems Aspects; Architecture for an All IP Network," 3GPP TR 23.922 V1.0.0 (Oct. 31, 1999).

* cited by examiner

APPARATUS AND METHODS FOR PER-SESSION SWITCHING FOR MULTIPLE WIRELINE AND WIRELESS DATA TYPES

CROSS-REFERENCE TO RELATED APPLICATIONS

This application claims the benefit of commonly assigned U.S. Provisional Application No. 60/611,221, entitled "MEDIA GATEWAY FOR MULTIPLE WIRELINE AND WIRELESS FORMATS, COMPONENTS THEREOF, AND PROCESSES PERFORMED THEREIN," filed on Sep. 18, 2004, the entirety of which is hereby incorporated by reference herein.

This application is also related to commonly assigned U.S. patent application Ser. No. 09/792,265, entitled "VOICE PACKET SWITCHING SYSTEM AND METHOD," filed on Feb. 23, 2001, the entirety of which is hereby incorporated by reference herein.

BACKGROUND

Telecommunication carriers are increasingly deploying multi-service packages, or bundled services, to customers to provide reduced overall access charges in an attempt to increase customer retention. For example, the boom in digital subscriber line subscriptions has led many carriers to bundle high bandwidth Internet service with traditional voice services. Recent market trends indicate an extensive consumer demand for these bundled services. Numerous cable carriers also provide bundled services in the form of traditional pay cable television services bundled with high bandwidth cable Internet access. Deregulation in the telecommunication industry that is now allowing long distance carriers to compete with local carriers promises to bring additional bundled services to the consumer. Wireless services are also being bundled with numerous combinations of the above-mentioned services. Already, carriers are feeling the strain of successfully upgrading existing infrastructures to meet the high-bandwidth services being demanded by customers.

Transition networks are commonly utilized to provide customer access to voice and data networks. An access network interfaces with voice and data switches each respectively interfacing with a data network, for example a packet backbone network, and the public switched telephone network. Typically, various classes of voice switches, for example class 4 switches for providing interexchange carrier (IXC) voice services and class 5 switches for providing end office voice services, are required within the transition network. Multiple media gateways are then required to interface with a data access switch.

Significant amounts of labor are expended to maintain and upgrade the transition networks as new services become available. A move to unified access is clearly advantageous and promises to propel emerging technologies that are not easily implemented over current large scale networks, for example voice over IP (VoIP), voice over DSL (VoDSL), UMTS and other wireless formats, TDM, and ATM, to a broader degree of acceptance.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
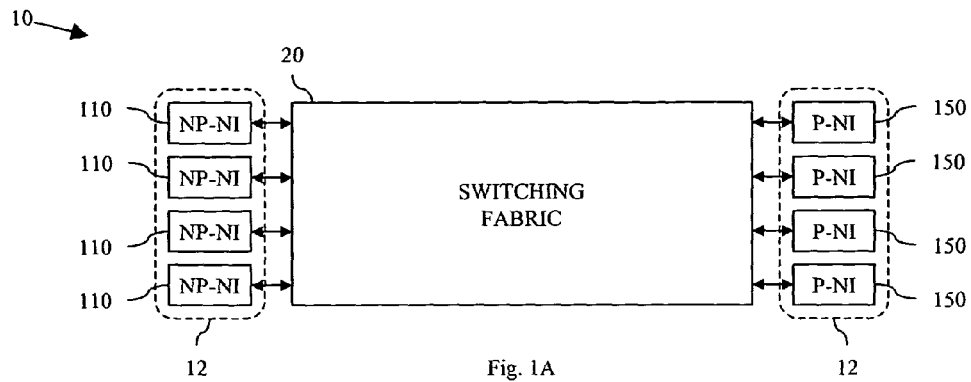
FIG. 1A is a schematic view of at least a portion of one embodiment of apparatus according to aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present disclosure is generally directed towards aspects of a multimedia session-based switching system, among other aspects. In the context of the present disclosure, the term "session" may reference a real-time, end-to-end communication connection or media path, where such may be established for the duration of an application, and may be independent of transmission media, codec and communication protocols. Such a "session" may include but is not limited to IP network based communications.

The ingress(es) of such a session, through a so-called "session switch," may support different physical links, layers 2, 3 and 4 protocols, in-band signaling mechanisms and/or codecs from the egress(es) of the same session. The session-based switching may provide necessary conversions of layers 2, 3 and 4 protocols, session headers, in-band signaling, codecs and session payload sizes, and may also provide subsequent switching, but may also provide other media processing functions, such as echo cancellation, announcement insertion, DTMF detection/generation, media bridging and others, all of which may be on per-session basis.

Protocols may include TDM, ATM, Frame relay, AAL1, AAL2, AAL5, MPLS, IP, UDP, TDP, RTP, and others, including as defined by standards in TDM, ATM, Frame Relay, IP and MPLS networks. Codecs may include G.711, G.726, G.723, G.729 for wireline voice, AMR, AMR-WD, EVRC for wireless voice, and H.263/H.264 for video, among others.

An aspect of relevance to the following description regards the fact that an ATM cell may include multiple payloads belonging to different sessions based on AAL2 and AAL1 protocols, for example. Similarly, an IP/RTP packet may carry multiple payloads belonging to different sessions based on RFC3267 and PW3E protocols, for example. Session headers can be RTP header or RTP-session header for VoIP or AAL2 header defined by AAL2 protocol. Further, per session in-band signaling may include Iu-UP and Nb-UP defined in UMTS as well as the in-band signaling defined in TFO. The difference between payload size may be dependent on codec selection, such as defined by standard profiles for different applications. For example, TDM, ATM, frame relay, AAL2, RTP, MPLS may all be viewed as supporting multiple sessions. That is, for TDM, some CDMA networks may require the media gateway to bundle multiple sessions into one channel or to extract multiple sessions from a single channel. For ATM, multiple UMTS sessions may exist in a single cell. For RTP, multiple sessions may be bundled into a single packet.

Thus, aspects of the present disclosure may regard a session switch which is different from traditional data switching defined in ATM, Frame Relay, Ethernet and IP switching products, at least in the context of interworking across ATM, FR, Ethernet, IP and TDM networks, for example. Such session switching may also be different from so-called multi-service switching in the context of merely switching among ATM, FR, Ethernet and IP protocols. For example, session switching can include AAL1-to-AAL2 switching, AAL2-to-AAL2 switching and AAL2-to-VoIP switching, which are not aspects of so-called multi-service switching. Moreover, since an IP/RTP packet may be divided into multiple sub-packets each corresponding to a different session, a session switch according to aspects of the present disclosure can involve sub-packet-to-sub-packet switching as well as AAL2-to-sub-packet switching, among others. Thus, a session switch may require greater session awareness, which may be achieved under the control of a softswitch or media gateway control device, or through the interception and processing of session-based signaling/control messages, such SIP, H.323, SS7, BICC, Megaco, MGCP, etc. Consequently, a session switch may provide the intelligence of session establishment and teardown to control per-session switching.

A session switch according to aspects of the present disclosure may also provide the capability to extract multiple sessions bundled inside a communication data unit, such as a TDM channel, an ATM cell or an IP packet, among others. Additionally, or alternatively, a session switch may provide the capability to switch multi-media sessions whose ingress data format and codec is different from that of the egress direction, including where ingress is from a wireline network and egress is to a wireline network, where ingress is from a wireless network and egress is to a wireline network, where ingress is from a wireline network and egress is to a wireless network, and where ingress is from a wireless network and egress is to a wireless network. For example, ingress may be from a TDM network (wireless or wireline) while egress may be to an ATM or IP network. Moreover, multi-media sessions thus defined may be point-to-point or point-to-multipoint.

The following is at least a partial list of the acronyms that appear in the present disclosure. Those skilled in the art will readily recognize that the terms corresponding to each of the acronyms listed below may vary within the art, within the embodiments explicitly described herein, and within other embodiments within the scope of the present disclosure. Those skilled in the art will also understand that aspects of the present disclosure are not limited to applications pertaining specifically to any one or more of the following acronyms. Acronyms not listed below but otherwise mentioned or discussed herein should be recognized and understood by those skilled in the pertinent art within the context of the present disclosure. In the event that an acronym is employed in the present disclosure in a manner inconsistent with its usage in the art, the scope of the present disclosure is intended to include both the ordinary usage in the art and the specific usage herein.

Acronym Term
  2G second generation wireless technology
  3G third generation wireless technology
  3GPP third generation partnership project
  3GPP2 third generation partnership project 2
  AAL ATM adaptation layer
  AAL2 ATM adaptation layer 2
  AMR adaptive multi-rate
  ATM asynchronous transfer mode
  CALEA Communication Assistance for Law Enforcement Act (1994)
  CDMA code-division-multiple-access
  CDMA2000 code-division-multiple-access (CDMA) version of the IMT-2000 standard developed by the International Telecommunication Union (ITU)
  CDR call detail record
  CID channel identifier
  Class 3 interexchange carrier (IEC); hierarchical interconnection for class 4 and optional class 5 switches
  Class 4 tandem office; toll office; interconnection for class 5 switches and long distance via class 3 IEC(s); optional direct connection to higher volume class 4 sites
  Class 5 central office; end office; connection to local CPE and local switching
  codec coder/decoder, or compression/decompression
  CPE customer premise equipment
  DSL digital subscriber line
  DSP digital signal processor
  ECC error correction code, error correcting code, or error checking and correcting
  EVR enhanced variable rate
  EVRC enhanced variable rate coder
  GPRS general packet radio service
  HDLC high-level data link control
  IMS IP multimedia subsystem
  IP Internet Protocol
  Iu interface between the 3G RNC and the 3G UMTS core network
  IuCS circuit switched interface between 3G RNC and 3G UMTS core network
  IuPS packet switched interface between 3G RNC and 3G UMTS core network
  IuFP Iu framing protocol
  Iu-UP Iu interface user plane
  MEGACO media gateway control, a control protocol between MG and MGC
  MG media gateway
  MGC media gateway controller
  MSC mobile switching center
  MSM multi-service module
  Nb interface between media gateways
  NP-NI non-packet network interface
  NP-SM non-packet switching matrix
  PCM pulse code modulation
  PI packet interface (e.g., packet network interface)
  P-NI packet network interface
  POTS plain old telephone service
  P-SM packet switching matrix
  PSTN public switched telephone network
  QoS quality of service
  RAN radio access network
  RNC radio network controller
  RNS radio network station
  RTCP real time transport control protocol, a control protocol for RTP
  RTP real-time-transport-protocol
  SAP service access point SAR segmentation and reassembly
SDR software defined radio; session detailed record
SGSN serving GPRS support node
SR software radio
SS7 Signaling System 7
TDM time-division multiplexing
TFO tandem free operation
TrFO transcoder free operation
TSI time slot interchange
UMA unlicensed mobile access
UMTS universal-mobile-telecommunications-service
VC virtual circuit
VoDSL voice over DSL; e.g., voice delivered using DSL
VoIP voice over IP; e.g., voice delivered using the Internet Protocol
VoP voice over packet; e.g., voice delivered using packets
W-CDMA Wideband Code-Division Multiple Access
WEP wired equivalent privacy
Wi-Fi wireless fidelity; wireless applications that use IEEE 802.11
WiMAX Worldwide Interoperability for Microwave Access, broadband wireless access technology, often based on IEEE 802.16
WLAN wireless local area network
WMG wireless media gateway which, in addition to wired or wireline capabilities, may include wireless switching, services, and/or other wired or wireline capabilities Referring to FIG. 1A, illustrated is a schematic view of at least a portion of one embodiment of an apparatus 10 according to aspects of the present disclosure. The apparatus 10 may be implemented as a media gateway. The media gateway may convert data from a format, protocol, and/or type required for one network to another format, protocol, and/or type required for another network, and/or otherwise convert data from a first type of data on a first transmission link to a second type of data on a second transmission link. Moreover, this conversion may be performed on a per-session basis or a per-channel basis. In this context, and according to other aspects of the present disclosure, a session and a channel may be synonymous. The media gateway may also terminate channels from a circuit-switched network and pass packet data for a packet-switched network, such as RTP streams in an IP network. Input data for the media gateway may include audio, video, fax and/or T.120 (real-time multi-point communications), among others, which the media gateway may handle simultaneously or otherwise. One or more media gateways may be deployed in conjunction with a media gateway controller, which is sometimes referred to as a softswitch, or a media gateway controller in an IMS framework.

As employed herein, a network may refer to an entire network or to a network portion, a network application, and/or network apparatus. To that end, one or more instances of the media gateway and/or softswitch, or components thereof, may be singularly or collectively employed to bridge two or more networks, including those of PSTNs and VoP networks, among others, and may carry traffic from both wireline networks (e.g., PSTN networks) and wireless networks (e.g., GSM and CDMA networks). PSTN networks may employ TDM, among other non-packet formats and/or protocols. VoP networks may employ VoATM, VoIP, VoIPoATM, VoDSL, other formats and/or protocols, and/or combinations thereof. VoP networks may also carry traffic in wireless formats and/or protocols, such as UMTS and CDMA, and/or combinations thereof, among others.

The apparatus 10 includes switching module 20 and, as in the embodiment shown in FIG. 1A, may include any number of network interfaces 12, wherein each of the network interfaces 12 may be or include a non-packet network interface (NP-NI) 110 and/or a packet network interface (P-NI) 150. Of course, other embodiments of the apparatus 10 within the scope of the present disclosure may include additional and/or alternative components, elements, devices, apparatus, systems, etc.

The network interfaces 12 may include and/or support a variety of physical interfaces, including channelized and un-channelized interfaces. For example, in one embodiment, the network interfaces 12 collectively support T1/E1, T3/DS3, OC-3/STM-1, and OC-12/STM-4 channelized interfaces, among others, as well as T1/E1, T3/DS3, OC-3c/STM-1c, and OC-12c/STM-4c un-channelized interfaces, among others.

The network interfaces 12 may send and receive TDM data from both wireline networks (e.g., PSTN) and wireless networks (e.g., wireless 2G GSM and CDMA). It may also send and receive packet data from both wireline networks (e.g., access and backbone ATM and IP) and wireless networks (e.g., wireless 3G UMTS and CDMA 2000). However, the scope of the present disclosure is not limited to these exemplary wireline and wireless networks.

In one embodiment, each of the network interfaces 12 corresponds to either a TDM or packet data type. Within the broad data type (TDM or packet), a network interface may be connected to multiple types of networks. For example, a first network interface 12 may send and receive native TDM data from one or more PSTN networks, in addition to wireless TDM data including GSM data. A second network interface 12 may send and receive native ATM data from an ATM network, in addition to UMTS data and VoATM data from a UMTS network. A third network interface 12 may send and receive VoIP data in addition to native IP data from an IP network. In one such example, the TDM data may include two or more voice signals multiplexed onto one or more channels of the data transmission link connected to the first network interface 12.

In one embodiment, the network interfaces 12 collectively include at least one interface for packet data and at least one interface for non-packet data. In such an embodiment, and possibly others, the packet data interface may be configured to send and receive wireless and wireline data, and/or the non-packet data interface may be configured to send and receive wireless and wireline data, on a per-session or per-channel basis. A session may be a point-to-point session, or a point-to-multipoint session.

Although schematically depicted in FIG. 1A as a single function, the switching module 20 may comprise more than one component, element, system, device, or apparatus, including hardware, or a combination of hardware and software, each of which may be configured to perform or assist with core switching and/or other activities. The switching module 20 is configured to pass data on a per-session basis between two NP-NIs 110 , between two P-NIs 150 , between an NP-NI and a P-NI-150, or otherwise between ones of a plurality of data transmission links. Of course, the switching module 20 may also be configured to send data back to a data transmission link from which the data was initially received. Thus, data may reach the switching module 20 via an NP-NI 110 , and the switching module 20 may send the data back to the same NP-NI 110 , possibly after the data is processed by processes other than core switching processes.

The switching module 20 is also a multi-format, multi-service module. That is, a data session passed between data transmission links by the switching module 20 includes wireless data (e.g., UMTS data, CDMA2000 data, etc.) and PSTN data (e.g., TDM data), among other types of data. Thus, in addition to PSTN services, the switching module 20 also supports wireless services, including in a 2G, 3GPP and/or 3GPP2 operating environment, in some embodiments. Examples of such wireless services or support therefor may include support of TrFO, TFO, MEGACO, IuCS User Plane Protocol, AMR Codec, and EVRC, among others. The ingress and egress of switched session data can be based on different Layer 1, Layer 2, Layer 3 and/or higher layer technologies, which may include TDM, ATM, MPLS, IP, RTP, and others.

In some embodiments, the switching module 20 is configured to pass VoIP data, ATM data, or both. The switching module 20 may also or alternatively be configured to pass other types of VoP data. In one embodiment, the switching module 20 is configured to pass TDM data, UMTS data, and one or more other types of packet and/or non-packet data. The switching module 20 may also be configured to pass more than one type of wireless data, such as two or more of GSM, UMTS, and CDMA2000, among others.

The switching module 20 may include one or more switching matrices. For example, the switching module 20 may include one switch matrix configured to process and/or pass packet data on a per-session basis and an additional switch matrix configured to process and/or pass non-packet data on a per-session basis.

The switching matrix included in the switching module 20 may include one or more time-division switching matrices (e.g., time slot interchangers, etc.) and one or more packet switching matrices, as well as hybrids of packet and time-division switching matrices and multi-stage or other combinations of packet and time-division switching matrices. One or more of the switching matrices may also support per-session based uni-casting, multicasting and/or broadcasting.

The switching module 20, or a portion thereof, may be configured to perform circuit switching (e.g., TDM data circuit switching, among others), such as to obtain a physical path dedicated to a connection between two intermediate or end-points for the duration of the connection, while simultaneously performing packet switching to provide connectionless or non-dedicated dedicated communication. Virtual circuit switching may also be achieved via the switching module 20, such as may provide a dedicated logical connection which doesn't prevent sharing a physical path among multiple connections. Such virtual circuit switching may establish or support establishing a logical connection on a dedicated basis for some finite, predetermined or calculated duration, and may also support permanent virtual circuits.

Figure 1B:
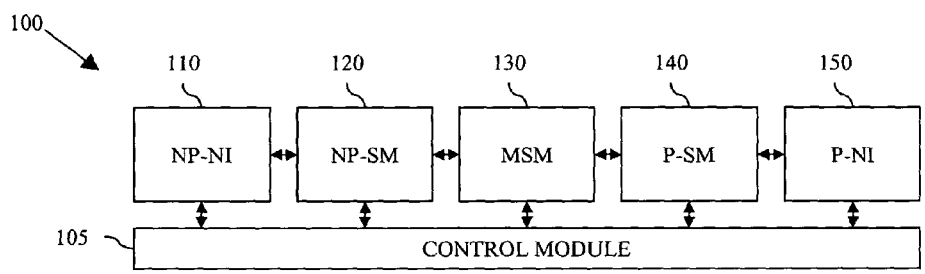
FIG. 1B is a schematic view of at least a portion of one embodiment of apparatus according to aspects of the present disclosure.

Referring to FIG. 1B, illustrated is a schematic view of at least a portion of one embodiment of the apparatus 10 according to aspects of the present disclosure, herein designated by reference numeral 100. In the embodiment shown in FIG. 1B, the apparatus 100 includes an NP-NI 110, a non-packet switching module (NP-SM) 120, a multi-service module (MSM) 130, a packet switching module (P-SM) 140, and a P-NI 150. The NP-NI 110 and/or P-NI 150 may be substantially similar to one of the network interfaces 12 described above.

The apparatus 100 may also include a control module 105 in communication with and/or configured to control one or more of the NP-NI 110, NP-SM 120, MSM 130, P-SM 140, and P-NI 150, such as for the purpose of per-session bases switching. The control module 105 may comprise two or more control modules, possibly configured as primary and redundant control modules. The scope of the present disclosure also does not limit the various possible configurations of the apparatus 100 to the embodiment shown in FIG. 1B. For example, the apparatus 100 may comprise more than one NP-NI 110 and/or more than one P-NI 150, among other combinations.

In some embodiments, one or more NP-NI 110 may be configured to provide varying capacities and redundancies, the selection of which may be tailored to a particular application. For example, one embodiment of the apparatus 100 may include a number and/or configuration of NP-NIs 110 that is sufficient to support one, several, or all of T1/E1, DS3/E3, OC-3/STM-1 and OC-12/STM-4, among others.

The NP-NI 110 may be configured to handle both inbound and outbound traffic. For example, the NP-NI 110 may receive data from external to the apparatus 100, such as from a network to which the apparatus 100 is connected, and may also receive data from internal to the apparatus 100. Consequently, the NP-NI 110 may also send data external to the apparatus 100, such as to a network connected thereto, and may also send data internal to the apparatus 100. In other words, the NP-NI 110 may be a two-way traffic port, supporting bidirectional traffic flow into and away from the apparatus 100.

The NP-NI 110 may also perform various analyses and/or manipulation of TDM data or other non-packet data introduced thereto. For example, the NP-NI 110 may perform one or more conventional and/or future-developed error checking processes, in addition to data framing. In some embodiments, such error checking may include parity checking processes, possibly for diagnostic purposes, and/or "ECC" processes, such that at least a percentage of any detected errors may be corrected (e.g., "on-the-fly") prior to passing the data to the next process, device, or component.

The NP-SM 120 is configured to receive TDM data and/or other non-packet data from the NP-NI 110, possibly from two or more NP-NI 110, and possibly on a per-session basis. Consequently, the NP-SM 120 may transmit non-packet data after appropriate switching has been performed. One possible destination for data transmitted by the NP-SM 120 is a digital signal processor (DSP) component of the MSM 130, and/or one or more other components of the MSM 130. For TDM-to-TDM calls, a call may be routed back to an NP-NI 110, possibly without going through any further processing by the MSM 130.

The MSM 130 is configured to receive packet data and non-packet data from the NP-SM 120 and the P-SM 140. Upon receipt, the MSM 130 may perform one or more of possibly several available data processing procedures, such as voice encoding/decoding, echo cancellation, and conversion of data between one or more non-packet modes and/or one or more packet modes on a per-session basis. For example, in one embodiment, the apparatus supports TDM, ATM, UMTS (or other wireless format/protocol), and IP (e.g., VoIP). In such an embodiment, the MSM 130 may perform the appropriate conversion between any first one of TDM, ATM, UMTS, and IP and any second one of TDM, ATM, UMTS, and IP, on a per-session basis. In some embodiments, conversion between different packet formats on a per-session basis (e.g., between UMTS and VOIP) may be performed prior to, after, or concurrently with conversion between packet and non-packet formats.

Conversion between native forms by the MSM 130 may include converting the incoming data from its native form into a common format or generic form, which may be identical or substantially similar to one of the native formats, a standard format, or a modified version of a standard format on a per-session basis. The common or generic form may also or alternatively be custom-tailored, designed, or created for the MSM 130 and/or the apparatus 100 or portion thereof, such as in accord with a high-level data link control (HDLC) format or protocol, or a modified portion or version thereof. In any case, the common data format may be capable of holding data converted from multiple various types of formats, including multiple wireless and wired or wireline formats, on a per-session basis.

The MSM 130 may also support or enable data encapsulation. An example of such data encapsulation includes the encapsulation of data in HDLC frames. Some embodiments of such encapsulation or framing employ a modified version of HDLC in which a specific number of bits and/or bytes, possibly of predetermined values, are included in one or more or all HDLC frames. Such embodiments may be employed to split words or other data portions into smaller portions, when necessary, possibly prior to performance of the processing performed by the MSM 130. Each such portion may correspond to a different communications session and/or channel. The additional bits and/or bytes may then be employed to reassemble the smaller portions into the desired larger format. The MSM 130 may also include an on-board TSI switching matrix configured to interconnect multiple resource modules to enhance the flexibility of replacing the existing resource modules on the same MSM 100 and/or plugging in new ones.

After the MSM 130 completes any necessary processing, the processed data may be sent to one of the NP-SM 120 or the P-SM 140 to complete the necessary switching. Moreover, the switching may be between any of possibly four or more wired and/or wireless sources, such as a UMTS data source, a VoIP data source, an ATM data source, and a TDM data source.

The P-NI 150 shown in FIG. 1B, which may be substantially similar to the P-NI 150 shown in FIG. 1A, performs substantially the same functions as the NP-NI 110, although for packet data instead of non-packet data. Thus, non-packet data received at the apparatus 100 via the NP-NI 110 may be sent to the MSM 130 after switching at the NP-SM 120, as described above. The MSM 130 may then perform any number of processes on the non-packet data on a per-session basis before or after converting the non-packet data to a version of HDLC or other common format and subsequently convert the common-format data into packet data. The converted packet data may then be sent to the P-SM 140 for switching to the desired outgoing port, ultimately through the P-NI 150, if appropriate. A converted packet may consist of data from multiple sessions, including data from multiple multiplexed sessions, such as multiple AAL2 payloads on an ATM cell.

Of course, the P-SM 140 may also receive packet data from the P-NI 150, including packet data from a variety of different types of packet data, possibly including wireless packet data. For example, the P-NI 150 may be configured to receive (and send) one or more of ATM data, VoIP data, and/or UMTS data, among others.

The control module 105 is configured to send and/or receive requests/messages from the MSM 130, the NP-SM 120, the P-SM 140, and/or any of the network interfaces 110, 150. The control module 105 may then process each request and determine an appropriate action on a per-session basis, such as switching between standby and operation units, collecting data, and allocating resources, among others, according to network conditions and predefined rules, among other possible considerations. Consequently, the control module 105 may be in direct or indirect communication with the MSM 130, the NP-SM 120, the P-SM 140, and/or any of the network interfaces 110, 150, and may send commands and/or instructions thereto.

The P-NI 150 may process packets prior to the packets being passed to another component, such as for packet classification and forwarding, among other possible processing, whether received from the P-SM 140 or a packet network. The P-NI 150 may send the processed packets to the P-SM 140 or send the packets back to the connected packet network, depending upon their ultimate destination.

A wireless network interface, which may be part of, substituted for, or employed in addition to a wired, P-NI 150, may be configured to receive wireless data from a radio access network or other networks which may carry packet or packetizable data. Such a wireless network interface may perform error checking, data framing and other functions. The wireless network interface may also be configured to subsequently send received data packets to the P SM 140.

Figure 1C:
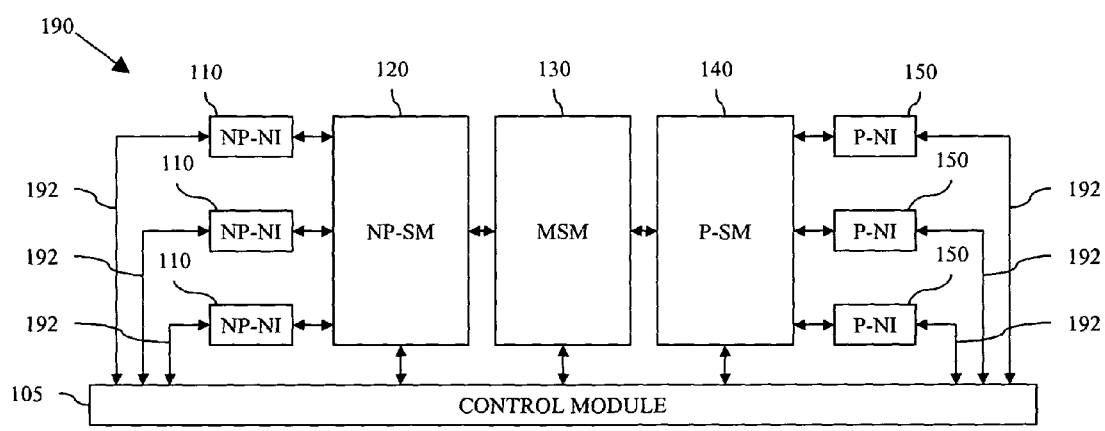
FIG. 1C is a schematic view of at least a portion of one embodiment of apparatus according to aspects of the present disclosure.

Referring to FIG. 1C, illustrated is a schematic view of one embodiment of the apparatus 100 shown in FIG. 1B, herein designated by the reference numeral 190. The apparatus 190 shown in FIG. 1C is provided to demonstrate that multiple NP-NIs 110 and/or multiple P-NIs 150 may be employed. Each network interface may be connected to the control module 105 by an individual bus 192, point-to-point connection, or other connection means.

Figure 2:
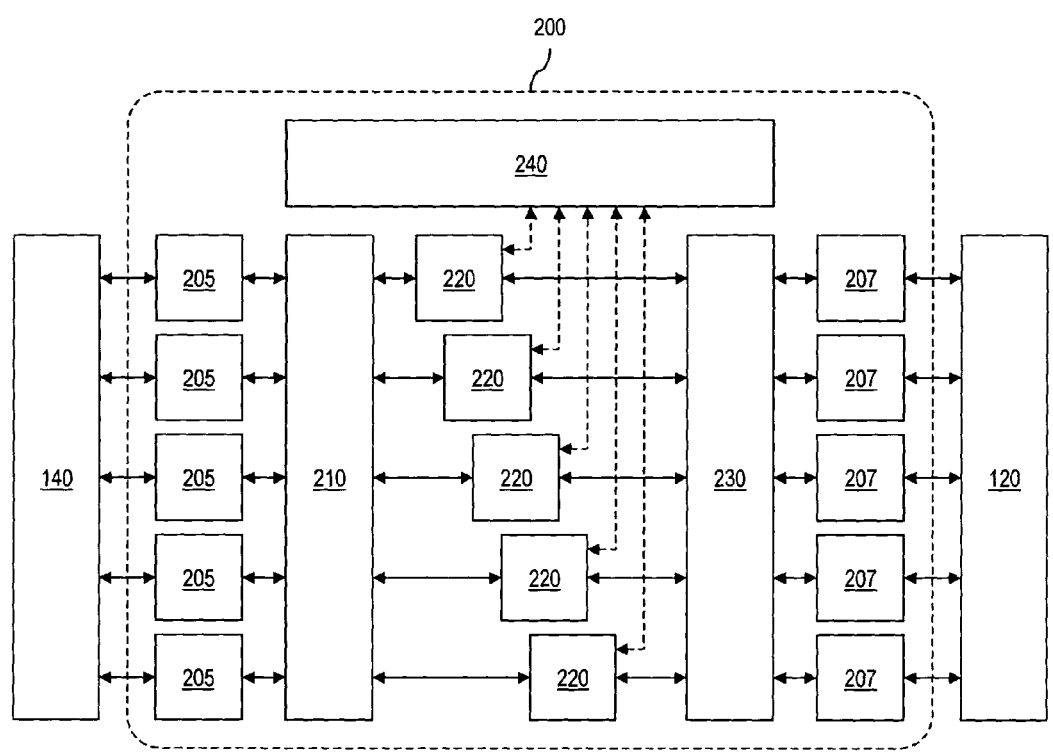
FIG. 2 is a schematic view of at least a portion of one embodiment of apparatus according to aspects of the present disclosure.

Referring to FIG. 2, illustrated is a schematic view of at least a portion of one embodiment of a multi-service module (MSM) 200 according to aspects of the present disclosure. Embodiments of the MSM 200 may be implemented in one or more embodiments of the apparatus 10 shown in FIG. 1A, the apparatus 100 shown in FIG. 1B, the apparatus 190 shown in FIG. 1C, and/or otherwise within the scope of the present disclosure. For example, aspects of the MSM 200 may be substantially similar to aspects of the MSM 130 shown in FIGS. 1B and 1C. However, other applications, environments, and implementations regarding the MSM 200 are also within the scope of the present disclosure.

The MSM 200 includes one or more ports 205 configured to send and receive packet data or otherwise provide an interface between the MSM 200 and a P-SM 140, which may be substantially similar to the P-SM 140 shown in FIGS. 1B and 1C. The MSM 200 also includes one or more ports 207 configured to send and receive non-packet data or otherwise provide an interface between the MSM 200 and a NP-SM 120, which may be substantially similar to the NP-SM 120 shown in FIGS. 1B and 1C. The number of ports 205 may be equal to, greater than, or less than the number of ports 207, and the MSM 200 may include a greater or lesser number of ports 205 and/or 207 than as depicted in the embodiment depicted in FIG. 2.

The MSM 200 also includes one or more sub-element processing (SEP) modules 210 and one or more digital signal processors (DSPs) 220, and may also include one or more TSI switching matrices 230, including in numbers other than as depicted in the illustrated embodiment. Aspects of sub-element processing stem from the fact that a packet of packet data may comprise multiple session or channel payloads, where each payload may corresponds to a different session or channel. Thus, in some embodiments within the scope of the present disclosure, sub-element processing includes specifically processing data of a particular session or channel payload within a packet comprising multiple payloads of multiple different sessions or channels. Element-level processing, in contrast to sub-element processing, processes the entire packet as a single unit, such that the multiple payloads, sessions or channels multiplexed or otherwise combined in the packet may not be individually processed according to their individual aspects.

The P-SM 140 is configured to receive packet data and switch the packet data onto one or more of the ports 205. For example, where UMTS-originating data has a TDM-destination, ATM cells of the UMTS call are each received by the P-SM 140 and switched onto one or more of the ports 205. Upon receiving such ATM cells, the SEP module 210 is configured to extract data from the cells, possibly including the separation of data from multiple channels that may be bundled in the cells. For example, the SEP module 210 may extract Iu-UP/AAL2 data from the ATM cells in addition to separating the multiple channels bundled therein. The SEP module 210 may then encapsulate channel data, such as into HDLC elements, and subsequently send the encapsulated elements to one or more of the DSPs 220.

The SEP module 210 is thus configured to perform sub-cell processing by dissecting the information of a single cell and subsequently extracting a portion of the cell's information for processing on a per-session basis. In one embodiment, the SEP module 210 may also or alternatively be configured to dissect the information of a single packet and subsequently extract a portion of the packet's information for processing on a per-session basis. Thus, whether the data element being examined by the SEP module 210 is a cell (e.g., an ATM cell), a packet (e.g., a VoIP packet), or another type of data element or unit, the SEP module 210 is configured to extract all or a portion of the data in the data element for processing, where such processing may include (without limitation) separate sessions, channels, connections, calls or other components bundled within the data element.

One or more of the DSPs 220 is configured to extract signaling and/or encoding data from the data elements received thereby on a per-session basis. For example, the DSPs 220 may be configured to extract Iu-UP signaling data and AMR codec data on a per-session basis from Iu-UP/AAL2 data encapsulated in HDLC packets. The DSPs 220 may then send the extracted signaling and/or encoding data to other components of the MSM 200. For example, continuing with the exemplary UMTS-to-TDM communication, the DSPs 220 may send the extracted AMR codec data to another DSP 220 for decoding, and may send the extracted Iu-UP signaling data to call-related processing software or other call-related processing means 240. The DSP 220 which initially received the data from the SAR module 210, and/or another DSP 220, may then decode the AMR codec data into a PCM stream. The PCM stream may pass through an on-board TSI 230, such as for delivery to other DSPs 220 for echo-cancellation and/or voice quality enhancement (VQE) processing. Multiple DSP functions can be optionally implemented on a single DSP chip.

The PCM stream may then be received by the NP-SM 120 via one or more of the ports 207, where it is appropriately switched on a per-session basis for delivery to, for example, a connected PSTN network. While the configuration and operation of the MSM 200 for packet-to-non-packet communication is described above in the exemplary context of UMTS-to-TDM communication, aspects thereof are readily applicable or adaptable to other packet-to-non-packet communication.

It follows from the above description that, in some embodiments, the DSPs 220 are configured for per-session data element conversion and data element services. For example, the DSPs 220 may be configured to convert data elements between UMTS or other wireless packet formats (among other wireless and wireline packet and non-packet formats) and HDLC, and the DSPs 220 may also be configured to perform echo-cancellation, VQE and other services in addition to the conversion. However, in one embodiment, these and/or other functions may be divided among the DSPs 220, such as where one or more DSP 220 may be dedicated to either data conversion or data services. For example, a "conversion DSP" 220 may be configured substantially to perform data conversion but not data services, and a "services DSP" 220 may be configured substantially to perform data services but not data conversion. In one embodiment, a first DSP 220 may be configured to perform a specific conversion (e.g., between UMTS and HDLC), a second DSP 220 may be configured to perform a different specific conversion (e.g., between VoIP and HDLC), a third DSP 220 may be configured to perform a specific service (e.g., echo-cancellation), and a fourth DSP 220 may be configured to perform a different specific service (e.g., VQE). Of course, these are only examples of the myriad configurations of the DSPs 220 within the scope of the present disclosure.

The MSM 200 is also configured to support packet-to-packet communication. For example, where UMTS-originating data has a UMTS-destination, ATM cells of the UMTS call are each received by the P-SM 140 and switched onto one or more of the ports 205. The SAR module 210 may then extract Iu-UP/AAL2 packets of multiple sessions from the ATM cells and separate multiple sessions or channels that may be bundled in one or more of the cells after per-session based processing. The SAR module 210 may then encapsulate extracted per-channel 0ao per-session data into HDLC packets and send them to a DSP 220.

The DSP 220 may extract Iu-UP signaling data and AMR codec data from the Iu-UP/AAL2 data of the HDLC packets, send the AMR codec data to another DSP 220 for further processing, and send the Iu-UP signaling data to call-related processing means 240. The DSP 220 which initially received the data from the SAR module 210, and/or another DSP 220, may then repackage the AMR codec packets into per-session Iu-UP packets which belong to another AAL2 virtual circuit (VC) connection with a different channel identifier (CID). A DSP 220 may also, or alternatively, repackage the AMR coded packets into per-session Iu-UP packets which belong to another AAL2 payload, with a different channel identifier (CID), multiplexed with other AAL2 payloads of different sessions on a virtual circuit (VC) connection.

The SAR module 210 may then reassemble the AAL2 data of multiple sessions into one cell and send it to the P-SM 140 via the ports 205 for delivery to the UMTS destination. Again, as with the UMTS-to-TDM communication example described above, the configuration and operation of the MSM 200 for packet-to- packet communication described above in the exemplary context of UMTS-to-UMTS communication is readily applicable or adaptable to other packet-to-packet communication.

The MSM 200 is also configured to support non-packet-to-packet communication.

For example, where TDM-originating per-session data has a UMTS-destination, TDM data received by the NP-SM 120 is switched onto one or more of the ports 207 and then to one or more of the DSPs 220, possibly through the TSI 230. The TDM data may be in the form of a PCM stream, as in the example described below, although other formats are also within the scope of the present disclosure (e.g., TFO TDM data, TrFO TDM data, and others).

The DSPs 220 may apply compression and/or echo-cancellation to the PCM stream. The DSPs 220 may also or alternatively package the TDM/PCM data into AMR codec or otherwise encoded data, possibly adding the appropriate Iu-UP, Nb-UP and/or other signaling data over HDLC. Such signaling data may be provided to the DSPs 220 by the call-related processing means 240 and/or DSPs 220 other than the DSP 220 performing the encoding. The AMR codec and signaling data may thus be packaged into Iu-UP/AAL2 payloads over HDLC, which may be sent to SEP module 210. The SEP module 210 may then assemble data for delivery to the P-SM 140, such as by assembling the HDLC or otherwise-packetized TDM-origin data into ATM cells or other data elements, possibly including bundling multiple channels into the data elements.

While the configuration and operation of the MSM 200 for non-packet-to-packet communication is described above in the exemplary context of UMTS-to-TDM communication, aspects thereof are readily applicable or adaptable to other non-packet-to-packet communication. Moreover, the MSM 200 may also be configured to support non-packet-to-non-packet communication. For example, tone generation, echo-cancellation, VQE and/or other activities may be performed where a communication has both a non-packet origin and a non-packet destination. In such instances, among others, the PCM stream or otherwise-formatted non-packet data may pass through the TSI 230 for delivery to one or more of the DSPs 220 and subsequently returned to the NP-SM 120, where it is appropriately switched for delivery to the PSTN or other non-packet network.

An additional or alternative example of a communication scenario for which the MSM 200 may be configured is an ATM-to-TDM communication, where the ATM-origin is not a UMTS-origin. In such a scenario, ATM cells received by the NP-SM 140 are switched onto one or more of the ports 205 for processing and/or servicing at a per-session, sub-element level (here, sub-ATM cell) prior to switching onto a TDM network. For example, the ATM cells may travel from the ports 205 to the SEP module 210, which may extract AAL1, AAL2, and/or AAL5 packets from the cells. The SEP module 210 may also separate multiple channels/sessions bundled in individual cells, possibly depending whether voice data is being is carried via AAL1, AAL2 or AAL5. The SEP module 210 may then encapsulate per-channel data into packets of a layer 2 transport protocol like HDLC or Ethernet, which are sent to one or more DSPs 220.

The DSPs 220 may extract per-session signaling data and codec data such that, for example, the codec data may be sent to another DSP 220 for decoding and the signaling data may be sent call-related processing means 240 for call-related processing. The same or a different DSP 220 may decode the codec data into a PCM stream, and the converted PCM stream may optionally be sent through the TSI 230 to reach other DSPs for echo-cancellation, VQE and/or other services. The NP-SM 120 can then switch the call for delivery to the connected PSTN network.

Figure 3:
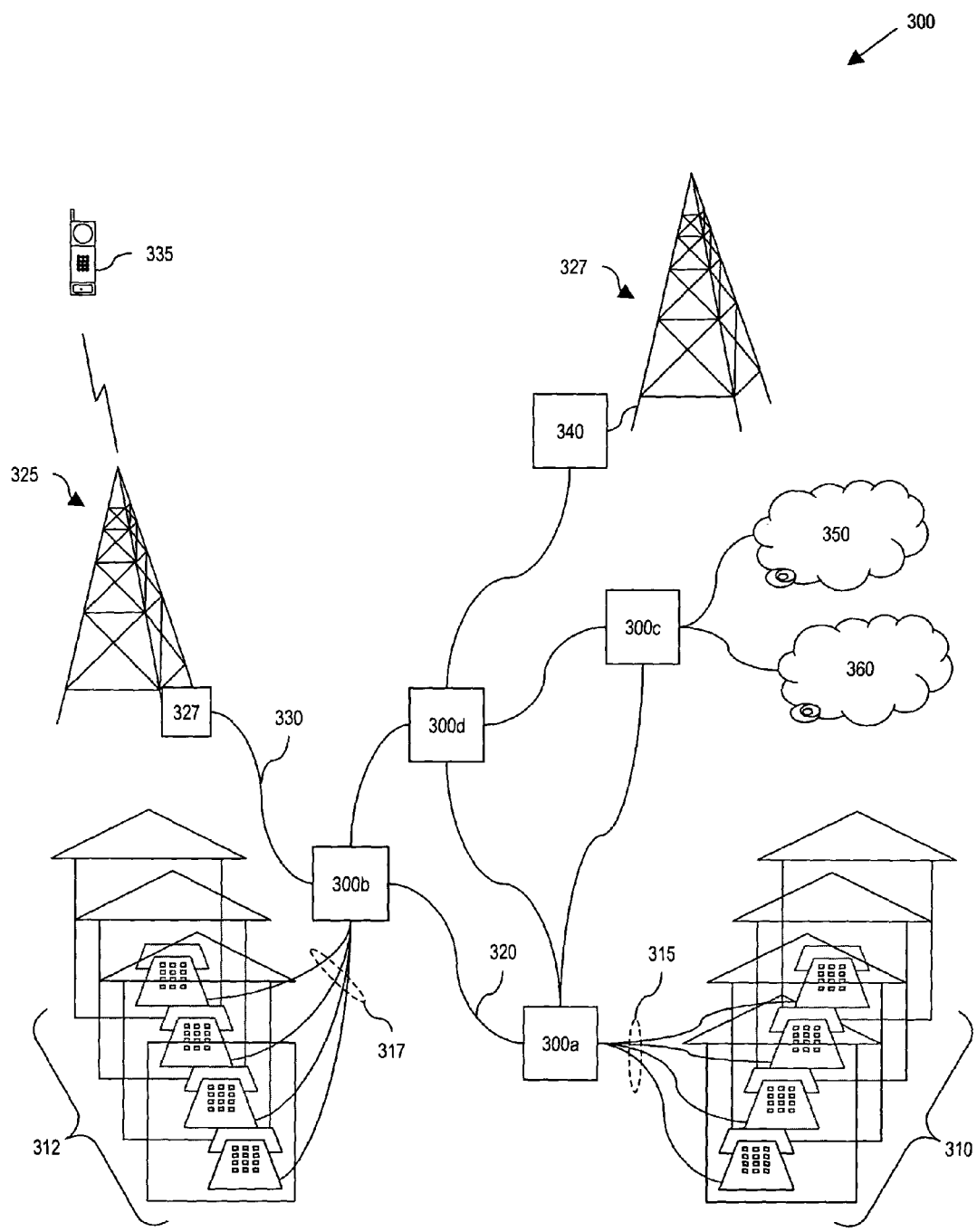
FIG. 3 is a block diagram of at least a portion of one embodiment of apparatus according to aspects of the present disclosure.

Referring to FIG. 3, illustrated is a schematic diagram of at least a portion of one embodiment of a network 300 according to aspects of the present disclosure. The network 300, which may include several networks and/or portions of networks, is one environment in which the apparatus 10 of FIG. 1A, the apparatus 100 of FIG. 1B, the apparatus 190 of FIG. 1C, and/or the apparatus 200 of FIG. 2 may be implemented according to aspects of the present disclosure. For example, the network 300 includes apparatus 300a-d, where aspects of each of the apparatus 300a-d may be substantially similar to aspects of the apparatus 10, 100, 190, and/or 200. The apparatus 300a-d may each be configured according to their particular role in the network 300, including with respect to their configuration of the number and type of interfaces (e.g., network interfaces), for example.

The apparatus 300a is connected by a plurality of loops 315 to one or more PSTN access networks 310 that may include a plurality of residential telephones and/or business exchanges (PBX). In one embodiment, the telephones may be grouped by digital loop carriers and/or other aggregators which, possibly in addition to one or more PBX, may be included in one or more of the PSTN access networks 310, or may otherwise be configured to communicate with the apparatus 300a through a PSTN network 310. The loops 315 may include digital loops and/or analog loops, and may be configured to transmit TDM and other PSTN data, VoIP data, DSL data, VoDSL data, and/or ATM data, among others, on a per-session basis. Thus, the apparatus 300a may be, or may be employed as, a central office switch, or a Class 5 switch. Accordingly, any PSTN access network 310 connected to the apparatus 300a may communicate with another PSTN access network 310 connected to the apparatus 300a.

The apparatus 300a is also connected to the apparatus 300b by a trunk or other transmission line 320. The apparatus 300b is, in turn, connected to a plurality of residential telephones, business PBXs, digital loop carriers, and/or PSTN access networks (hereafter collectively referred to as PSTN access networks, although merely for the sake of simplicity) 312 by a corresponding plurality of loops 317, which may each be substantially similar to one or more of the loops 315. Thus, any of the PSTN access networks 310 may communicate with any of the PSTN access networks 312 via the apparatus 300a and 300b, the trunk 320, and corresponding ones of the loops 315, 317.

The apparatus 300b is also connected to a tower 325 or tower controller 327 by one or more copper and/or fiber cables 330. The tower 325 may be a base station (e.g., in a 2G wireless network) and/or a radio network station (e.g., an RNS in a radio access network (RAN) or 3G wireless network). The tower controller 327 may be a base station controller (e.g., a BSC in a 2G wireless network) and/or a radio network controller (e.g., an RNC in an RAN or 3G wireless network), at least in part. Consequently, any PSTN access network 312 may communicate with a wireless phone 335 (e.g., a cellular or radio phone) within range of the tower 325 via the apparatus 300b, a corresponding one of the loops 317, the cable 330, the tower controller 327, the tower 325, and a wireless/radio signal between the tower and wireless phone 335.

The apparatus 300d is also configured to support wireless communications, and may otherwise be substantially similar to the apparatus 300b (and/or the apparatus 300a) except that the apparatus 300d is not directly connected to any PSTN access networks. Nonetheless, a PSTN access network (e.g., network 310 and/or network 312) may still communicate with the apparatus 300d, although such communications may first be transmitted through the apparatus 300a and/or the apparatus 300b. Consequently, the apparatus 300d may still cooperate with a wireless portion of the network 300.

The apparatus 300c may be deployed as a media gateway to interconnect a PSTN network 350 to a packet network 360, and/or to interconnect a wireless network via apparatus 300d and 300b to a PSTN network 350 and/or a packet network 360. The apparatus 300c may also or alternatively be deployed as a tandem media gateway or Class 4 switch to interconnect a local access PSTN network via apparatus 300a to a tandem PSTN network 350 and/or packet network 360.

One or more of the apparatus 300a-d may also be a wireless access point, such as those configured to support UMA, Wi-Fi, WLAN and/or WiMAX communications or other communications received by the apparatus 300a-d from a wireless access point and/or wireless access network. Unlicensed mobile access (UMA) technology, for example, provides access to GSM and GPRS mobile services over unlicensed spectrum technologies, including Bluetooth and 802.11. By deploying UMA technology, service providers can enable subscribers to roam and handover between cellular networks and unlicensed wireless networks. Wi-Fi and WLAN communications may include those in which a mobile user connects to a local area network (LAN) through a wireless (radio) connection, such as by IEEE 802.11 technology. WiMAX communications may include those in compliance with IEEE 802.16 standards for broadband wireless access (BWA) networks. Such wireless access point communications switched by one of the apparatus 300*a-d* may be encrypted, such as by the wired equivalent privacy (WEP) algorithm, among others. Thus, in some embodiments, the data services performed by the corresponding one or more of the apparatus 300*a-d* may include encryption/decryption services. For example, one or more of the DSPs 220 of the apparatus 200 shown in FIG. 2 may perform such services. Moreover, such encryption/decryption services may be performed on a per-session, per-channel and/or sub-element basis according to aspects described above.

In view of all of the above, it should be understood that the present disclosure introduces an apparatus that includes a switching module configured to pass per-session data between ones of a plurality of data transmission links, wherein the data includes wireless packet data (e.g., UMTS, WLAN and WiMAX data) and wireline non-packet data (e.g., TDM data), among other, possibly additional data types. In some embodiments, the per-session data passed between data transmission links also includes VoIP data, ATM data, or both VoIP data and ATM data, among other, possibly additional data types.

Additionally, although aspects of the present disclosure are described in the context of per-session or per-channel data or processing, many such aspects are applicable and/or readily adaptable to data and processing other than on a per-session basis. Similarly, aspects not explicitly described above in a per-session or per-channel context may also be applicable and/or readily adaptable to a per-session or per-channel context within the scope of the present disclosure. Moreover, many aspects of per-session or per-channel data or processing described herein may be substantially similar to aspects of sub-element data or processing described herein, such that these terms may be employed synonymously or interchangeably herein, although such interchangeability is not necessarily implied for every aspect described herein.

In some embodiments described herein or otherwise within the scope of the present disclosure, the switching means are "integrated" in the sense that the switching means employ one or more common backplanes, are housed in a common housing or cabinet, and/or are controlled by a single control module. Alternatively, or additionally, the switching means are "integrated" in the sense that the plurality of network interfaces that join the switching means to a plurality of networks are replaceable units (e.g., line-replaceable units) relative to the integrated switching means such that, for example, a non-packet network interface may be removed from a slot or other mechanical interface to the switching means and replaced with a packet network interface without requiring modification of the mechanical interface or the switching means.

The present disclosure introduces a sub-element processing (SEP) module configured to perform sub-element processing on a per-session basis for each of a plurality of data elements included in data being switched between ones of a plurality of transmission links. The per-session, sub-element data can include wireless packet data, wireless non-packet data, wireline packet data and/or wireline non-packet data. The sub-element processing performed by the SEP module can include the extraction and/or bundling of voice data, encoding data and/or signaling data that corresponds to one or more channels or sessions within individual ones of the plurality of data elements (e.g., multiplexed RTP for VOIP). Also disclosed herein are apparatus that include embodiments of the SEP module, such as a media gateway, among others.

One embodiment of an apparatus that may or may not include such an SEP module but is otherwise within the scope of the present disclosure includes integrated means for switching: (1) ones of a plurality of received universal-mobile-telecommunications-service (UMTS) communications to ones of a plurality of time-division multiplexing (TDM) destinations; (2) ones of a plurality of received code-division-multiple-access-2000 (CDMA2000) communications to ones of the plurality of TDM destinations; (3) ones of a plurality of received TDM communications to ones of a plurality of UMTS destinations; and (4) ones of the plurality of received TDM communications to ones of a plurality of CDMA2000 destinations. Such integrated switching means may also or alternatively be configured to switch packet-origin data to packet-destination data, such as Iu-UP over AAL2 over ATM to Nb-UP, among other examples.

Among the numerous methods embodying aspects of the present disclosure, an embodiment of one such method includes receiving a non-TDM data element including bundled first and second data, wherein the first data corresponds to a first session of a first non-TDM-to-TDM communication and the second data corresponds to a second session of a second non-TDM-to-TDM communication. The non-TDM data element is switched via a non-TDM data switching matrix. Channel-specific data is extracted from each of the first and second sessions, wherein the session-specific data includes at least one of voice data, encoding data and signaling data each corresponding to one of the first and second channels. The extracted channel-specific data is then employed to generate a PCM session corresponding to at least one of the first and second non-TDM-to-TDM communications. The PCM session is then switched via a TDM data switching matrix.

An embodiment of a similar method according to aspects of the present disclosure includes receiving first and second PCM sessions each corresponding to first and second TDM-to-non-TDM communications, respectively. The first and second PCM sessions are switched to a sub-element processing (SEP) module via a TDM data switching matrix. First voice data is extracted from the first PCM session and second voice data is extracted from the second PCM session. At least one data element is then built, the element including the first and second data sessions in combination with encoding and signaling data associated with a non-TDM destination of at least one of the first and second TDM-to-non-TDM communications. The at least one data element is then switched via a non-TDM data switching matrix.

Other apparatus according to aspects of the present disclosure include apparatus for switching each of a plurality of received packet wireless calls at a sub-cell/sub-packet level, or on a per-session basis, to one of a plurality of wireline or wireless destinations in a seamless manner without extensive and expensive conversions and redirection. In one embodiment, the disclosed system may also be configured to switch each of the plurality of received wireline communications to one of a plurality of packet-based, non-UMTS destinations, as well as each of a plurality of received UMTS communications to one of the plurality of packet-based, non-UMTS destinations on a per-session basis. Such a system may also be configured to switch each of a plurality of received packet-based, non-UMTS communications to one of a plurality of UMTS destinations and/or to one of a plurality of TDM destinations on a per-session basis. In one embodiment, the plurality of received packet-based, non-UMTS communications includes ATM communications, VoIP communications, or ATM and VoIP communications. The plurality of packet-based, non-UMTS destinations may also include ATM destinations, VoIP destinations, or ATM and VoIP destinations.

The present disclosure also provides an apparatus including integrated means for switching each of a plurality of received wired or wireline communications (e.g., via TDM) to one of a plurality of wireless destinations (e.g., via UMTS), as well as each of a plurality of received wireless communications (e.g., via UMTS) to one of a plurality of wired or wireline destinations (e.g., via TDM) on a per-session basis. In one embodiment, the integrated switching means may also be configured to switch each of the plurality of received wired or wireline communications to one of a plurality of packet-based, non-UMTS destinations, as well as each of a plurality of received UMTS communications to one of the plurality of packet-based, non-UMTS destinations on a per-session basis. Such integrated switching means may also be configured to switch each of a plurality of received packet-based, non-UMTS communications to one of a plurality of UMTS destinations and/or to one of a plurality of TDM destinations on a per-session basis.

A method introduced in the present disclosure includes, in one embodiment, receiving a plurality of non-packet (e.g., TDM) communications and also receiving a plurality of wireless packet (e.g., UMTS) communications. Such a method also includes switching at least one of the plurality of non-packet communications to one of a plurality of wireless packet destinations and another of the plurality of non-packet communications to one of a plurality of non-packet destinations on a per-session basis. The method also includes switching at least one of the plurality of wireless packet communications to one of a plurality of wireless packet destinations and another of the plurality of wireless packet communications to one of a plurality of non-packet destinations on a per-session basis.

The foregoing has outlined features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An apparatus, comprising:
   a media gateway that includes:
   a sub-element processing (SEP) module configured to perform sub-element processing for each of a plurality of data elements included in data being switched between ones of a plurality of transmission links, wherein the SEP module is integral to an integrated switching means configured to interface with each of the plurality of transmission links;
   wherein the data includes wireless packet data, wireless non-packet data, wireline packet data and wireline non-packet data;
   wherein the sub-element processing includes at least one of extracting and bundling at least one of voice data, encoding data and signaling data corresponding to one of a plurality of channels or sessions bundled within individual ones of the plurality of data elements;
   wherein the sub-element processing further includes processing data of a particular session or channel payload within a data element comprising multiple payloads of multiple different sessions or channels, wherein each of the multiple payloads is processed on a separate per-session basis and wherein the SEP module is coupled to, in the media gateway, at least one digital signal processor (DSP) that performs a separate per-session data element service on each of the multiple different sessions or channels in the data element;
   wherein the sub-element processing further includes converting the data of at least one of the multiple different sessions or channels in the data element between a packet format and a non-packet format; and
   wherein the integrated switching means includes at least one digital signal processor (DSP) configured to:
   perform data element conversion on a per-session basis to convert the wireless packet data, the wireless non-packet data, the wireline packet data and the wireline non-packet data into common data having a common protocol; and
   cooperate with a common data switching matrix and the SEP module to:
   switch the wireless and wireline packet data from a packet data switching matrix to a non-packet data switching matrix on a per-session basis; and
   switch the wireless and wireline non-packet data from the non-packet data switching matrix to the packet data switching matrix on a per-session basis.

2. The apparatus of claim 1 wherein the sub-element processing includes per-session processing where ones of the plurality of data elements each include multi-session data.

3. The apparatus of claim 1 wherein the plurality of data elements includes at least one of:
   a plurality of ATM cells; and
   a plurality of IP packets.

4. The apparatus of claim 1 wherein the plurality of data elements includes a plurality of ATM cells each including at least one of:
   a plurality of Iu-UP/AAL2 packets; and
   a plurality of Nb-UP/AAL2 packets.

5. The apparatus of claim 1 wherein the integrated switching means includes a packet data switching matrix integrated with a non-packet data switching matrix.

6. The apparatus of claim 1 wherein the common protocol is at least partially based on a layer 2 transport protocol.

7. The apparatus of claim 6 wherein the layer 2 transport protocol is selected from the group consisting of:
   high-level data link control (HDLC) protocol; and
   Ethernet protocol.

8. The apparatus of claim 1 wherein the at least one DSP is further configured to perform data element services.

9. An apparatus, comprising:
   integrated means for switching:
   ones of a plurality of received universal-mobile-telecommunications-service (UMTS) communications to ones of a plurality of time-division multiplexing (TDM) destinations;
   ones of a plurality of received code-division-multiple-access-2000(CDMA2000) communications to ones of the plurality of TDM destinations;
   ones of a plurality of received TDM communications to ones of a plurality of UMTS destinations; and
   ones of the plurality of received TDM communications to ones of a plurality of CDMA2000 destinations;

wherein the integrated switching means includes a sub-element processing (SEP) module having a plurality of ports and configured to convert, by sub-element processing:
each of ones of the plurality of received UMTS communications into a UMTS-to-TDM communication;
each of ones of the plurality of received CDMA2000 communications into a CDMA2000-to-TDM communication;
each of ones of the plurality of received TDM communications into a TDM-to-UMTS communication;
each of ones of the plurality of received TDM communications into a TDM-to-CDMA-2000communication;
wherein each of the received communications includes wireless packet data, wireless non-packet data, wireline packet data and wireline non-packet data;
wherein the sub-element processing includes processing data of a particular session or channel payload within a data element comprising multiple payloads of multiple different sessions or channels, wherein each of the multiple payloads is processed on a separate per-session basis and wherein the SEP module is coupled to, in the integrated means for switching, at least one digital signal processor (DSP) that performs a separate per-session data element service on each of the multiple different sessions or channels in the data element;
wherein the sub-element processing further includes converting the data of at least one of the multiple different sessions or channels in the data element between a packet format and a non-packet format; and
wherein the integrated means for switching includes at least one digital signal processor (DSP) configured to:
perform data element conversion on a per-session basis to convert the wireless packet data, the wireless non-packet data, the wireline packet data and the wireline non-packet data into common data having a common protocol; and
cooperate with a common data switching matrix and the SEP module to:
switch the wireless and wireline packet data from a packet data switching matrix to a non-packet data switching matrix on a per-session basis; and
switch the wireless and wireline non-packet data from the non-packet data switching matrix to the packet data switching matrix on a per-session basis.

10. The apparatus of clam 9 further comprising at least one network interface by which ones of the plurality of received UMTS communications are received from at least one wireless network component that is not integral to the apparatus.

11. The apparatus of claim 9 wherein the integrated switching means further includes a first switching matrix and a second switching matrix, wherein:
the first switching matrix is configured to switch each of the plurality of received TDM communications onto one of the plurality of SEP module ports;
the first switching matrix is further configured to switch each of the plurality of UMTS-to-TDM communications and each of the plurality of CDMA2000-to-TDM communications from one of the plurality of SEP module ports to a first network interface associated with a corresponding one of the plurality of TDM destinations;
the second switching matrix is configured to switch each of the plurality of received UMTS communications and each of the plurality of received CDMA2000communications onto one of the plurality of SEP module ports; and
the second switching matrix is further configured to switch each of the plurality of TDM-to-UMTS communications and each of the plurality of TDM-to-CDMA2000 communications from one of the plurality of SEP module ports to a second network interface associated with a corresponding one of the plurality of UMTS destinations and the plurality of CDMA2000 destinations.

12. A method, comprising:
in a media gateway:
receiving first and second PCM streams each corresponding to first and second time-division multiplexing (TDM)-to-non-TDM communications, respectively;
switching the first and second PCM streams to a sub-element processing (SEP) module via a TDM switching matrix, wherein the SEP module is integral to an integrated switching means;
extracting first voice data from the first PCM stream and second voice data from the second PCM stream;
building a data element that includes the first and second voice data in combination with encoding and signaling data associated with a non-TDM destination of at least one of the first and second TDM-to-non-TDM communications, wherein building the data element includes bundling the first and second voice data in combination with the encoding and signaling data in a payload of the data element so that the payload of the data element contains bundled data from plural channels or sessions;
switching the at least one data element via a non-TDM switching matrix;
wherein the SEP module is further adapted to process data of a particular session or channel payload within the payload of the data element comprises multiple payloads of multiple different sessions or channels, wherein each of the multiple payloads is processed on a separate per-session basis and wherein the SEP module is coupled to, in the media gateway, at least one digital signal processor (DSP) that performs a separate per-session data element service on each of the multiple different sessions or channels in the data element;
wherein the SEP module is further adapted to convert the data of at least one of the multiple different sessions or channels in the data element between a packet format and a non-packet format; and
wherein the integrated switching means includes at least one digital signal processor (DSP) configured to:
perform data element conversion on a per-session basis to convert the TDM and non-TDM communications into common data having a common protocol; and
cooperate with a common data switching matrix and the SEP module to:
switch the non-TDM data from a packet data switching matrix to a non-packet data switching matrix on a per-session basis; and
switch the TDM data from the non-packet data switching matrix to the packet data switching matrix on a per-session basis.

13. The method of claim 12 wherein the SEP module and the TDM and non-TDM switching matrices are integral to an integrated switching means and the SEP module is configured to perform the data element building.

14. The method of claim 12 wherein building the at least one data element includes:
building a first data element that includes the first voice data in combination with first encoding and signaling data associated with a first non-TDM destination of the first TDM-to-non-TDM communication; and building a second data element that includes the second voice data in combination with second encoding and signaling data associated with a second non-TDM destination of the second TDM-to-non-TDM communication.

15. The method of claim 12 wherein building the at least one data element includes building a multi-channel data element including the first and second voice data.

16. An apparatus, comprising:
a media gateway that includes:
a processing module configured to process each of a plurality of multimedia data elements on a per-session basis to switch the plurality of multimedia data elements between ones of a plurality of transmission links on a per-session basis,
wherein the per-session processing includes at least one of extracting and bundling at least one of voice data, encoding data and signaling data corresponding to one of a plurality of sessions or channels bundled within individual ones of the plurality of multimedia data elements;
wherein the processing module is integral to an integrated switching means configured to interface with each of the plurality of transmission links;
wherein the plurality of multimedia data elements includes wireless packet data, wireless non-packet data, wireline packet data and wireline non-packet data;
wherein the per-session processing further includes processing data of a particular session or channel payload within a multimedia data element comprising multiple payloads of multiple different sessions or channels, wherein each of the multiple payloads is processed on a separate per-session basis and wherein the processing module is coupled to, in the media gateway, at least one digital signal processor (DSP) that performs a separate per-session data element service on each of the multiple different sessions or channels in the data element;
wherein the per-session processing further includes converting the data of at least one of the multiple different sessions or channels in the data element between a packet format and a non-packet format; and
wherein the integrated switching means includes at least one digital signal processor (DSP) configured to:
perform data element conversion on a per-session basis to convert the wireless packet data, the wireless non-packet data, the wireline packet data and the wireline non-packet data into common data having a common protocol; and
cooperate with a common data switching matrix and the processing module to:
switch the wireless and wireline packet data from a packet data switching matrix to a non-packet data switching matrix on a per-session basis; and
switch the wireless and wireline non-packet data from the non-packet data switching matrix to the packet data switching matrix on a per-session basis.

17. The apparatus of claim 16 wherein the plurality of multimedia data elements includes wireless packet data, wireless non-packet data, wireline packet data and wireline non-packet data, each including data corresponding to a plurality of multimedia sessions.

18. The apparatus of claim 16 wherein the plurality of multimedia data elements includes at least one of:
a plurality of ATM cells; and
a plurality of IP packets.

19. The apparatus of claim 16 wherein the plurality of multimedia data elements includes a plurality of ATM cells each including at least one of:
a plurality of Iu-UP/AAL2 packets; and
a plurality of Nb-UP/AAL2 packets.

20. The apparatus of claim 16 wherein the integrated switching means includes a packet data switching matrix integrated with a non-packet data switching matrix.

21. The apparatus of claim 16 wherein the common protocol is at least partially based on a layer 2 transport protocol.

22. The apparatus of claim 21 wherein the layer 2 transport protocol is selected from the group consisting of: high-level data link control (HDLC) protocol; and Ethernet protocol.

23. The apparatus of claim 16 wherein the at least one DSP is further configured to perform data element services.

24. An apparatus, comprising:
a media gateway that includes:
means for receiving unlicensed mobile access (UMA) communications;
means for switching the UMA communications to a time-division multiplexing (TDM) network and to a non-TDM network;
means for sub-element processing each of a plurality of data elements included in the UMA communications being switched;
wherein the means for sub-element processing comprises a means for processing data of a particular session or channel payload within a data element comprising multiple payloads of multiple different sessions or channels, wherein each of the multiple payloads is processed on a separate per-session basis and wherein the means for sub-element processing is coupled to, in the media gateway, at least one digital signal processor (DSP) that performs a separate per-session data element service on each of the multiple different sessions or channels in the data element;
wherein the means for sub-element processing further comprises a means for converting the data of at least one of the multiple different sessions or channels in the data element between a packet format and a non-packet format and
wherein the means for switching includes at least one digital signal processor (DSP) configured to:
perform data element conversion on a per-session basis to convert UMA communications into common data having a common protocol; and
cooperate with a common data switching matrix and the means for sub-element processing to:
switch the UMA communications from a packet data switching matrix to a non-packet data switching matrix on a per-session basis; and
switch the UMA communications from the non-packet data switching matrix to the packet data switching matrix on a per-session basis.

25. An apparatus, comprising:
a media gateway that includes:
means for receiving wireless fidelity (Wi-Fi) communications;
means for switching the Wi-Fi communications to a time-division multiplexing (TDM) network and to a non-TDM network;
means for sub-element processing each of a plurality of data elements included in the Wi-Fi communications being switched;
wherein the means for sub-element processing comprises a means for processing data of a particular session or channel payload within a data element comprising multiple payloads of multiple different sessions or channels, wherein each of the multiple payloads is processed on a separate per-session basis and wherein the means for sub-element processing is coupled to, in the media gateway, at least one digital signal processor (DSP) that performs a separate per-session data element service on each of the multiple different sessions or channels in the data element;

wherein the means for sub-element processing further comprises a means for converting the data of at least one of the multiple different sessions or channels in the data element between a packet format and a non-packet format and wherein the means for switching includes at least one digital signal processor (DSP) configured to:

perform data element conversion on a per-session basis to convert Wi-Fi communications into common data having a common protocol; and cooperate with a common data switching matrix and the means for sub-element processing to:
- switch the Wi-Fi communications from a packet data switching matrix to a non-packet data switching matrix on a per-session basis; and
- switch the Wi-Fi communications from the non-packet data switching matrix to the packet data switching matrix on a per-session basis.

26. An apparatus, comprising:

a media gateway that includes:
means for receiving wireless local area network (WLAN) communications;
means for switching the WLAN communications to a time-division multiplexing (TDM) network and to a non-TDM network;
means for sub-element processing each of a plurality of data elements included in the WLAN communications being switched;
wherein the means for sub-element processing comprises a means for processing data of a particular session or channel payload within a data element comprising multiple payloads of multiple different sessions or channels, wherein each of the multiple payloads is processed on a separate per-session basis and wherein the means for sub-element processing is coupled to, in the media gateway, at least one digital signal processor (DSP) that performs a separate per-session data element service on each of the multiple different sessions or channels in the data element;
wherein the means for sub-element processing further comprises a means for converting the data of at least one of the multiple different sessions or channels in the data element between a packet format and a non-packet format and
wherein the means for switching includes at least one digital signal processor (DSP) configured to:
perform data element conversion on a per-session basis to convert the WLAN communications into common data having a common protocol; and
cooperate with a common data switching matrix and the means for sub-element processing to:
- switch the WLAN communications from a packet data switching matrix to a non-packet data switching matrix on a per-session basis; and
- switch the WLAN communications from the non-packet data switching matrix to the packet data switching matrix on a per-session basis.

27. An apparatus, comprising:

a media gateway that includes:
means for receiving Worldwide Interoperability for Microwave Access (WiMAX) communications;
means for switching the WiMAX communications to a time-division multiplexing (TDM) network and to a non-TDM network;
means for sub-element processing each of a plurality of data elements included in the WiMAX communications being switched;
wherein the means for sub-element processing comprises a means for processing data of a particular session or channel payload within a data element comprising multiple payloads of multiple different sessions or channels, wherein each of the multiple payloads is processed on a separate per-session basis and wherein the means for sub-element processing is coupled to, in the media gateway, at least one digital signal processor (DSP) that performs a separate per-session data element service on each of the multiple different sessions or channels in the data element;
wherein the means for sub-element processing further comprises a means for converting the data of at least one of the multiple different sessions or channels in the data element between a packet format and a non-packet format and
wherein the means for switching includes at least one digital signal processor (DSP) configured to:
perform data element conversion on a per-session basis to convert WiMAX communications into common data having a common protocol; and
cooperate with a common data switching matrix and the means for sub-element processing to:
- switch the WiMAX communications from a packet data switching matrix to a non-packet data switching matrix on a per-session basis; and
- switch the wireless and wireline non-packet data from the WiMAX communications to the packet data switching matrix on a per-session basis.

* * * * *